(12) United States Patent
Westmoreland et al.

(10) Patent No.: US 8,681,512 B2
(45) Date of Patent: Mar. 25, 2014

(54) ACTIVE CLAMP RESONANCE CONTROL

(75) Inventors: David Westmoreland, Cypress, TX (US); Tatsuaki Ambo, Tokyo (JP)

(73) Assignee: Toshiba International Corporation, Houston, TX (US)

( * ) Notice: Subject to any disclaimer, the term of this patent is extended or adjusted under 35 U.S.C. 154(b) by 459 days.

(21) Appl. No.: 11/765,692

(22) Filed: Jun. 20, 2007

(65) Prior Publication Data

US 2008/0013346 A1    Jan. 17, 2008

Related U.S. Application Data

(60) Provisional application No. 60/806,052, filed on Jun. 28, 2006.

(51) Int. Cl.
*H02M 3/335* (2006.01)
*H02M 3/337* (2006.01)
*H02M 3/338* (2006.01)

(52) U.S. Cl.
USPC .......................... 363/21.02; 363/97; 363/132

(58) Field of Classification Search
USPC ............. 363/16, 17, 21.02, 21.03, 87, 97, 98, 363/131, 132; 323/207
See application file for complete search history.

(56) References Cited

U.S. PATENT DOCUMENTS

| 6,038,142 | A  | * | 3/2000 | Fraidlin et al. ................... 363/17 |
| 6,069,803 | A  | * | 5/2000 | Cross .......................... 363/21.14 |
| 7,561,446 | B1 | * | 7/2009 | Vinciarelli ....................... 363/17 |

\* cited by examiner

*Primary Examiner* — Adolf Berhane
*Assistant Examiner* — Nusrat Quddus
(74) *Attorney, Agent, or Firm* — Westerman, Hattori, Daniels & Adrian, LLP

(57) ABSTRACT

According to some preferred embodiments, power converter includes a comparator circuit with feedback from current-fed PI or PID control to select one of two regeneration times of at least one active clamp: i) wherein at low loads a regeneration circuit is turned ON for substantially an entire current-transfer cycle such as to avoid output of current-fed converter continuing to rise; and ii) wherein at high loads the regeneration period is reduced to between about ¼ to ½ of a resonance-frequency cycle so that a resonance between the regeneration capacitance and the transformer's leakage inductance avoids excessive ringing currents and/or lost efficiency.

26 Claims, 8 Drawing Sheets

ACTIVE CLAMP RESONANCE CONTROL

BACKGROUND OF THE INVENTION

1. Field of the Invention

The present invention generally relates to power conversion circuits, and the preferred embodiments provide improved power conversion circuits for e.g., uninterruptible power supplies.

2. Background Discussion

Uninterruptible power supplies (UPSs) are commonly used to provide power to critical equipment that must not experience even short duration brownouts or blackouts. For example, computer servers, computer networks, telecommunications electronics and medical devices are often powered by an uninterruptible power supply.

A UPS device typically has an AC-DC-AC converter and backup battery that is activated in case the alternating current (AC) line power is temporarily disconnected or falls below a voltage threshold.

FIG. 5 shows one illustrative and non-limiting conventional UPS circuit according to the background art. The illustrated conventional UPS circuit includes an input rectifier (having switches Q1, Q2) and an output inverter (having switches Q3, Q4) connected in series. The input rectifier converts AC input power to DC power, and the output inverter converts the DC power to AC output power. Typically, the switches Q1, Q2, Q3, and Q4 will be MOSFET devices or insulated gate bipolar transistors (IGBTs). The switches Q1, Q2 Q3, and Q4 are controlled by a gate drive circuit (not shown). Storage capacitors C1 C2 store DC power. Typically, an isolation transformer T is provided. The input rectifier switches Q1, Q2 receive AC line power and provide direct current (DC) power to the inverter switches Q3, Q4. The inverter switches Q3, Q4 are typically operated according to a pulse-width modulation (PWM) scheme. The PWM waveform is filtered by output inductor Lo and output capacitor Co to create a smooth AC output waveform. With this illustrative arrangement, the voltage and frequency of the AC output can be accurately controlled independently of the AC input.

A variety of topologies are known for providing a controlled DC power source. One such topology is a full-bridge current-fed design. In such a design, a DC current source is alternately switched between diagonals of a full-bridge switching network on a primary side of a transformer. By controlling the periods during which each diagonal is conducting, a desired output voltage on the secondary side of the transformer can be obtained. However, limiting stresses on semiconductor switching components of the bridge is an inherent challenge in such a topology. Toward that end, a variety of snubber, clamp and other stress-reducing circuit designs have been proposed. In addition to controlling the conduction and non-conduction of the bridge circuit, the stress-reducing circuits typically require some control mechanism. One example of a full bridge power converter with an active clamp circuit is described in U.S. Pat. No. 6,038,142. In the described system, an active clamp circuit composed of a capacitor and a switching MOSFET is connected across the DC side of a full-bridge network of switching transistors. The voltage across the switching network is monitored during the switching cycle. When that voltage reaches zero (called a "zero voltage transition" in the '142 patent), the non-conducting switches in the bridge are turned on.

A number of other background references are seen in the following U.S. Patents, the entire disclosures of which are each incorporated herein by reference: 1) U.S. Pat. No. 6,898,093, entitled Power Conversion Circuit With Clamp and Soft Start (hereinafter the '093 patent); and 2) U.S. Pat. No. 4,646,222 entitled Inverter Provided With An Overvoltage Clamping Circuit (hereinafter the '222 patent). The '222 patent indicates, among other things, that "[c]onventionally, when an output voltage of a voltage source inverter is boosted by a transformer, a resonance voltage on the order of tens of kilohertz is caused due to the leakage inductance of the transformer and the leakage capacitances of a load cable and a load AC motor." With reference to the '093 patent, the patent teaches a power converter that includes:

[A] current source providing an input current, a transformer having primary and secondary windings, a switch network coupling the current source and the primary winding, and a clamping circuit coupled to the switch network. An output bus is coupled to the secondary winding and provides an output voltage. A control circuit has inputs based on the output voltage and the input current, and generates switch network control signals based on those inputs. The control circuit also generates clamping circuit control signals based on the switch network control signals. The power converter may also include a start-up control circuit configured to selectively control the switch network and the clamping circuit so as to raise the output voltage to a desired level. In some embodiments, the switch network is a full bridge, and the clamping circuit includes first and second clamping switches.

See Abstract.

According to the '093 patent:

The present invention address many of the challenges presented by the above described and other prior designs. Instead of requiring a separate monitoring circuit to check for a zero voltage transition point in the switching network, a circuit according to the present invention controls operation of both switching and clamping transistors based on output bus voltage during normal operation. During a start-up mode of operation, a microprocessor can be used to control the switching and clamping transistors according to a preset cycle until the output voltage reaches a desired starting level.

In one illustrative embodiment, a power converter includes a current source providing an input current, a transformer having primary and secondary windings, a switch network coupling the current source and the primary winding, and a clamping circuit coupled to the switch network. An output bus is coupled to the secondary winding and provides an output voltage. A control circuit has inputs based on the output voltage and the input current, and generates switch network control signals based on those inputs. The control circuit also generates clamping circuit control signals based on the switch network control signals. The power converter may also include a start-up control circuit configured to selectively control the switch network and the clamping circuit so as to raise the output voltage to a desired level. In some illustrative embodiments, the switch network is a full bridge, and the clamping circuit includes first and second clamping switches.

See Summary of the Invention.

More particularly, FIGS. 6 and 7 depict a system as set forth in the '093 patent. In this regard, FIG. 6 is a schematic diagram of a power conversion circuit 10 according to an illustrative embodiment of the invention. Power conversion circuit 10 includes a transformer 12. In one embodiment, transformer 12 has a 1:1 winding ratio, but may have other winding ratios in other configurations. The primary side of transformer 12 is shown to the left in FIG. 1. Voltage source 14 may be a rectified DC input (e.g., rectified AC line input), DC input supplied by a battery, or other DC input. Coupled to voltage source 14 is a boost inductor 16. A Hall effect transducer 18 or other appropriate current sensor is interposed between voltage source 14 and inductor 16, and provides an output signal E (the purpose of which is described below). Voltage source 14 and inductor 16 are coupled to the primary winding of transformer 12 by switch transistors 20, 22, 24 and 26. Switch transistors 20, 22, 24 and 26 form a full bridge switch network. Switch transistors 20, 22, 24 and 26 are controlled by signals A(1), B(1), B(2) and A(2) applied to their respective gates. When signals A(1) and A(2) are high and signals B(1) and B(2) are low, current flows through the "A" diagonal of the bridge by passing through high side transistor 20, through the primary winding of transformer 12, and then through low side transistor 26. When signals A(1) and A(2) are low and signals B(1) and B(2) are high, current flows through the "B" diagonal of the bridge by passing through high side transistor 22, through the primary winding of transformer 12 (now in the opposite direction), and then through low side transistor 24. When signals A(1), A(2), B(1) and B(2) are all high, conversion circuit 12 is in a shorted primary condition, and current flows to ground from the output of boost inductor 16 through switch transistors 20, 22, 24 and 26, bypassing the primary winding of transformer 12.

Clamping switch transistors 28 and 30, together with clamping capacitor 32, are located on the AC side of the bridge. In other words, the source of clamping switch transistor 28 is coupled to the junction between the source of transistor 20 and the primary winding of transformer 12, and the source of clamping switch transistor 30 is coupled to the junction between the source of transistor 22 and the primary winding of transformer 12. Also shown as part of transistors 28 and 30 are body diodes which allow current to flow from the sources to the drains of transistors 28 and 30. Body diodes may (and typically would) also be present in transistors 20, 22, 24 and 26, but are omitted so as not to obscure the drawing. Clamping switch transistor 28 is controlled by signal C applied to its gate. Clamping switch transistor 30 is controlled by signal D applied to its gate. When signals A(1), A(2) and C are high and signals B(1), B(2) and D are low, clamping switch transistor 28 and clamping capacitor 32 connect the primary side of transformer 12 to ground. When signals A(1), A(2) and C are low and signals B(1), B(2) and D are high, clamping switch transistor 30 and clamping capacitor 32 connect the primary side of transformer 12 to ground.

On the secondary side of the transformer, an output voltage $V_{OUT}$ is provided across an output bus formed by terminals 35 and 37. Diodes 38, 40, 42 and 44 form a rectifying bridge coupling the secondary winding of transformer 12 to the output bus. Capacitors 34 and 36 form a voltage doubler. A signal F, the purpose of which is described below, is tapped from the output bus.

FIG. 7 is a schematic diagram of the control circuitry 100 for power conversion circuit 10 during normal operating mode. As used herein, "normal operating mode" refers to a state in which power conversion circuit 10 is being used to provide a desired voltage output. Conversely, "start-up mode" refers to a state in which power conversion circuit 10 is being initially activated (e.g., from a condition in which the entire system is turned off or otherwise substantially powered down), and in which various circuit components are being readied for normal operating mode. One input to control circuitry 100 is the signal F, a feedback signal from the output bus (FIG. 6). Output voltage feedback signal F and a reference voltage $V_{REF}$ are provided to a Proportional Integrator Differentiator (PID) 110 formed by operational amplifier (op amp) 112, resistors 114 and 116, and capacitors 118 and 120. The output signal of PID 110, labeled $V_{1-REF}$, is provided through resistor 122 to the inverting node of op amp 124. Also provided to the inverting node of op amp 124, through resistor 126, is the signal E generated from Hall effect transformer 18 (FIG. 6) measuring current between voltage source 14 and boost inductor 16. A feedback loop having resistor 128 and capacitor 130 connects the output node and inverting node of op amp 124. The output signal $V_{1-x}$ from op amp 124 is then fed to the non-inverting input of comparator 132. The inverting input of comparator 132 receives the saw tooth waveform signal SAW from carrier generator 134. The output of comparator 132, labeled SHORT, is fed to one input of OR gate 136 and to one input of OR gate 138.

Carrier generator 134 also provides a clocking signal CLOCK to flip flop 140. The clocking signal has the same frequency as the SAW signal. Flip flop 140 then outputs two signals, labeled PHASE_A and PHASE_B, that are respectively provided as inputs to OR gates 136 and 138 via RC networks 152, 154 and 156, 158. The SHORT signal is provided as a second input to OR gates 136 and 138. The output of OR gate 136 then provides the control signals B(1) and B(2) to the gates of switch transistors 22 and 24. The output of OR gate 138 provides the control signals A(1) and A(2) to the gates of switch transistors 20 and 26. Control signal C for clamping switch transistor 28 is provided by AND gate 142, the inputs to which are the inverted output of OR gate 136 (via inverter 141) and the non-inverted output of OR gate 138. Control signal D for clamping switch transistor 30 is provided by AND gate 144, the inputs to which are the inverted output of OR gate 138 (via inverter 143) and the non-inverted output of OR gate 136.

While a number of systems and methods are known in the art, there remains a need in the art for improved systems and methods that improve upon the above and/or other known technologies.

SUMMARY OF THE INVENTION

The present invention improves upon the above and/or other background technologies and/or problems therein.

According to some illustrative embodiments, a power converter is provided that includes: a current source providing an input current; a transformer; a switch network connected to the current source and connected to a primary winding of the transformer; a clamping circuit connected to the switch network; a control circuit configured to control the time in a cycle that the clamping circuit is turned on to a period of between about a quarter cycle and one half cycle for the resonant period. In some embodiments, the clamping circuit includes a single clamp, while in some embodiments the clamping circuit includes two clamps. In some embodiments, the resonant period is between about ¼ to ½ cycle, or, more preferably, between about ¼ to ⅓ cycle, or, more preferably, about slightly over ¼ cycle. In some preferred embodiments, the clamping circuit includes at least one clamping capacitor that is gated ON a sufficient time to transfer charge and is gated OFF after about ¼ cycle. In the preferred embodiments, the switch network includes a plurality of switches that are controlled by a control circuit. In some examples, the system is configured for operating in two modes to enable switching to control an output voltage during a light load case.

Although in some the preferred embodiments a plurality of switches are employed, in some alternative embodiments, aspects of the present invention can be employed within single switch power converters, such as, e.g., a flyback converter.

According to some other embodiments, a method of active regeneration control is performed that includes employing a comparator circuit with feedback from current-fed PI control to select one of two regeneration times of at least one active clamp: i) wherein at low loads a regeneration circuit is turned ON for substantially an entire current-transfer cycle such as to avoid output of current-fed converter continuing to rise; and ii) wherein at high loads the regeneration period is reduced to between about ¼ to ½ of a resonance-frequency cycle so that a resonance between the regeneration capacitance and the transformer's leakage inductance avoids excessive ringing currents and/or lost efficiency.

In some preferred embodiments, the method further includes employing four switching states, including; a) a first switching state in which all switches are on in a charging mode to store energy in an inductor; b) a second switching state in which in which current is diverted to the least one active clamp such that energy that was stored in the inductor transfers to a transformer from which it is isolated and sent to a load; c) a third switching state in which all switches are on in a charging mode; and d) a fourth switching state in which current is diverted to at least one active clamp to inhibit a high voltage across the switches and transformer that would result from the inductor sourcing current into the transformer's leakage reactance. In some preferred embodiments, the method further includes employing regeneration tank splitting with at least one active clamp including multiple clamps.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DETAILED DESCRIPTION OF THE PREFERRED EMBODIMENTS

While the present invention may be embodied in many different forms, there is described here detailed illustrative embodiments with the understanding that the present disclosure is to be considered as an example of the principles of the invention and is not intended to limit the invention to the illustrated embodiments.

Embodiments of the invention can be employed within, e.g., a modular UPS system, such as, e.g., that produced by TOSHIBA INTERNATIONAL CORPORATION, INC. In some embodiments, a power module includes two major components. A first component plugs into a connector and comprises the inverter. A second component is the converter, which accepts the AC in or a battery input, and then isolates and converts it to a DC bus voltage and regulates it. In some embodiments, both the inverter and the converter slide into a plastic module, and the module then slides onto a chassis.

In the preferred embodiments, aspects of the present invention are employed within a modular redundant system. In some preferred embodiments, aspects of the preferred embodiments, enabling the increase of efficiency and the reduction of electromagnetic interference and/or radio frequency interference (EMI/RFI) could be included within each module. In some embodiments, an overall system could include, e.g., a chassis, power modules, battery modules, and a display module, with aspects of the preferred embodiments being employed within the power modules. In some non-limiting examples, between about one to ten power modules can be provided per system, depending on chassis sizes, ordering options, etc. The number of modules per chassis size can be varied depending on circumstances. In some implementations, aspects of the present invention can be employed as an improvement to a system as shown in the '093 patent, the entire disclosure of which is incorporated herein above.

The Preferred Embodiments

Figure 1A:
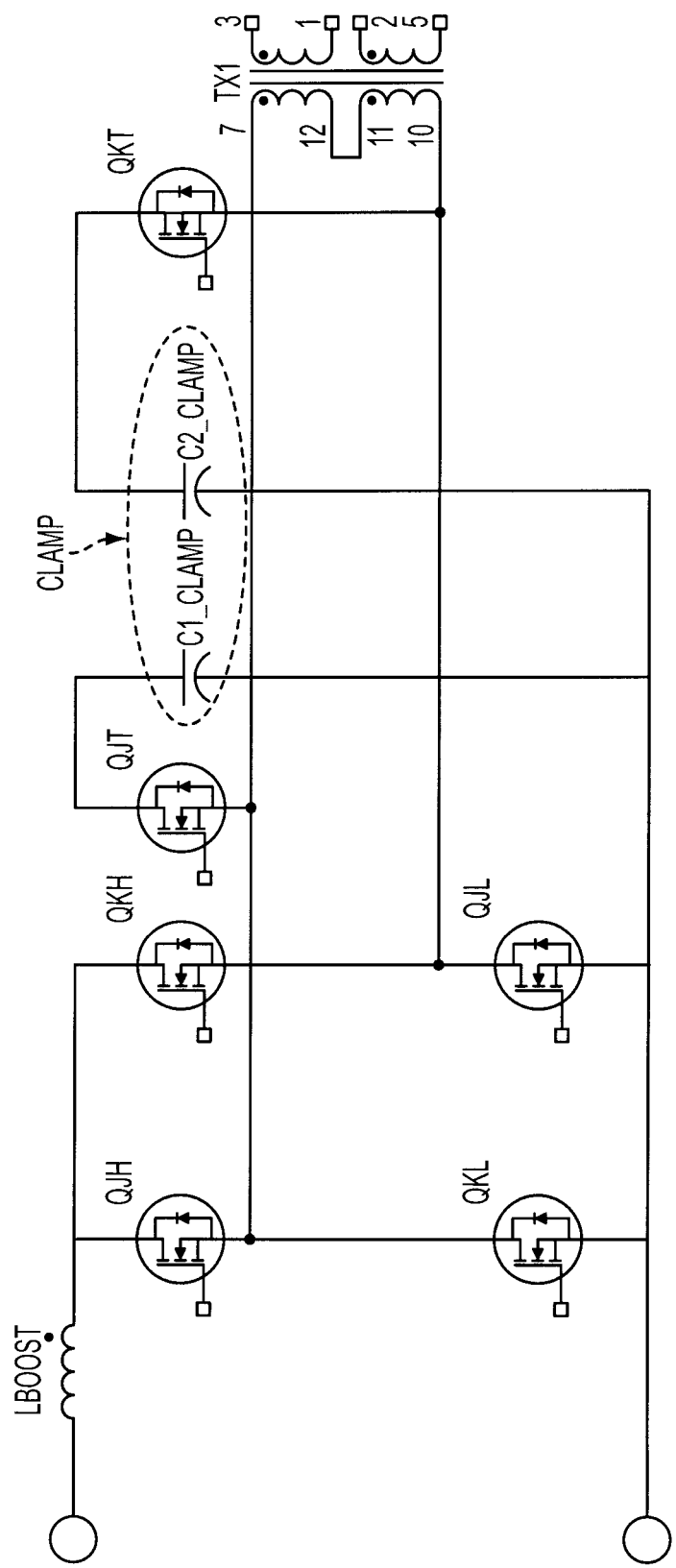
FIG. 1(A) is a schematic diagram of a power conversion circuit according to some illustrative embodiments of the invention.

According to the preferred embodiments, a boost-mode current-fed converter is provided that uses transformer isolation. Some embodiments are described below with reference to FIG. 1(A). In this regard, FIG. 1(A) is a schematic diagram of a power conversion circuit according to some illustrative embodiments of the invention, As shown in this illustrative example, four basic switching states are utilized in QJH, QJL, QKH, and QKL.

a) The first state involves "all 4 on;"
b) The second state involves only QJL and QJH on;
c) The third state involves "all 4 on;" and
d) The fourth state involves QKL and QKH on.

In this figure, the indicia H within the reference numerals designates "high," the indicia L within the reference numerals designates "low," and the indicia T within the reference numerals designates "transfer"—e.g., facilitating reference to the function of the device in the circuit when it is turned on/off.

Between the "all 4 on" modes (e.g., the first and third states) and the QJH/QJL or QKH/QKL modes (e.g., the second and fourth states), the inductor current is diverted to active clamps (OJT, QKT) to prevent a high voltage across the switches and transformer that would result from the inductor sourcing current into the transformer's leakage reactance. In addition, the active clamps return the energy to the circuit through the transformer. The transformer's leakage inductance forms a resonant tank with the active clamps' capacitors.

In the first state—e.g., the all 4 on (also referred to as, e.g., the shorting mode or charging mode)—one notable purpose of this state is to store energy in the inductor Lboost in the diagram. In the second state, involving turning on only QJL and QJH, while in that case, QKL and QKH are turned off, during that time, energy that was stored in the inductors, then transferred to the TX1 transformer and then from the TX1 is isolated and the energy is sent to the load (not shown in the diagram). In the third state, the system returns to the all 4 on or the charging mode. And, in the fourth state, where only QKL and QKH remain on, the system is transferring power back through the transformer but just in the opposite polarity one gets positive and negative polarity from transfer of power to the load. However, due to non-ideal characteristics of the transformer TX1, there is a certain finite amount of leakage inductance.

In the preferred embodiments, after the $1^{st}$ state or mode where all 4 switches are turned on and then going to the next mode with two switches on, then the current that flows to the inductor, tries to remain constant, but because the transformer has leakage inductance, the current flowing to the leakage inductance would try to develop a very high voltage that might damage the switches, so in preferred embodiments, what is called an active clamp (e.g., QJT and QKT) form a circuit with the C1 clamp and the C2 clamp.

Without any kind of clamp circuit, voltage would be too high and would damage the devices. Accordingly, by putting in the clamp, the energy is directed to charge up the C1 or C2 clamp, depending on which cycle the device is in. And, then the device is turned on at an appropriate time in the cycle in order to divert that stored charge in the capacitor back to the transformer to take that stored energy and return it to the circuit to use it rather than to simply dissipate it through the capacitor/snubber.

Most advantageously, one notable improvement over prior systems, such as, e.g., that shown in the '093 patent, involves, e.g., the advantageous controlling of the amount of time that QJT and QKT are turned on. A noteworthy reason for this controlling is that the capacitors in the C1 or C2 clamp form a resonant circuit with the leakage inductance of the TX1. A result of this resonance is that the current will actually start to flow in back and forth and actually reverse directions. However, when turning on, the device would want current to flow in one direction to discharge the capacitor into the transformer and then to stop that flow before it continues to flow back and forth.

Accordingly, in some preferred embodiments, a method is provided that includes a circuit configured to actually control the amount of time that the clamps are turned on. In this regard, in some preferred embodiments, about a quarter cycle is selected for the resonant period. Testing has shown that slightly over ¼ cycle is most desirable. Moreover, it is noted that more than ½ cycle is not needed because over about that amount, the current goes from positive (e.g., discharging) to negative again. Testing has shown that a period slightly over ¼ cycle is sufficient to transfer the charge and with values significantly more than that: such as, e.g., close to ½ of a cycle, it is seen that the current starts flowing backwards and it is seen that there doesn't seem to be any kind of indicator from measuring circuit voltages that there has been any additional charge transferred from C1 or C2 to TX1 and from TX1 to the load(s).

In the preferred embodiments, in order to limit the resonant time and to stop a "back and forth" energy shuttling, QJT and QKT are gated off after approximately ¼ cycle of the resonant period. Among other things, this reduces electromagnetic interference and/or radio frequency interference (EMI/RFI) and increases overall efficiency. In the preferred embodiments, at least about ¼ cycle is used to insure the energy in the active-clamp capacitors is transferred to the load via the transformer. If the clamp is gated for more than about ½ cycle of the resonant period, the current will then start to flow back from the transformer into the active-clamp capacitors, which involves a needless and/or wasteful flow.

The inventors have conducted tests that have shown that gating QJT or QKT on for just over about ¼ cycle is sufficient to transfer the charge, while durations just below about ½ cycle resulted in some reverse current flow as the switches have integral diodes with finite reverse-recovery time.

While in the illustrated embodiments, such as, e.g., shown in FIG. 1(A), metal oxide semiconductor field-effect transistors (MOSFETS) are depicted, it is contemplated that in other embodiments various other switches can be employed, such as, e.g., insulated gate bipolar transistors (IGBTs) and/or some later devices used to effect switching. Similarly, while certain embodiments of the '093 patent show MOSFETS, the teachings therein can similarly be adapted to include any other appropriately now known or later known switches or switching devices.

Figure 1B:
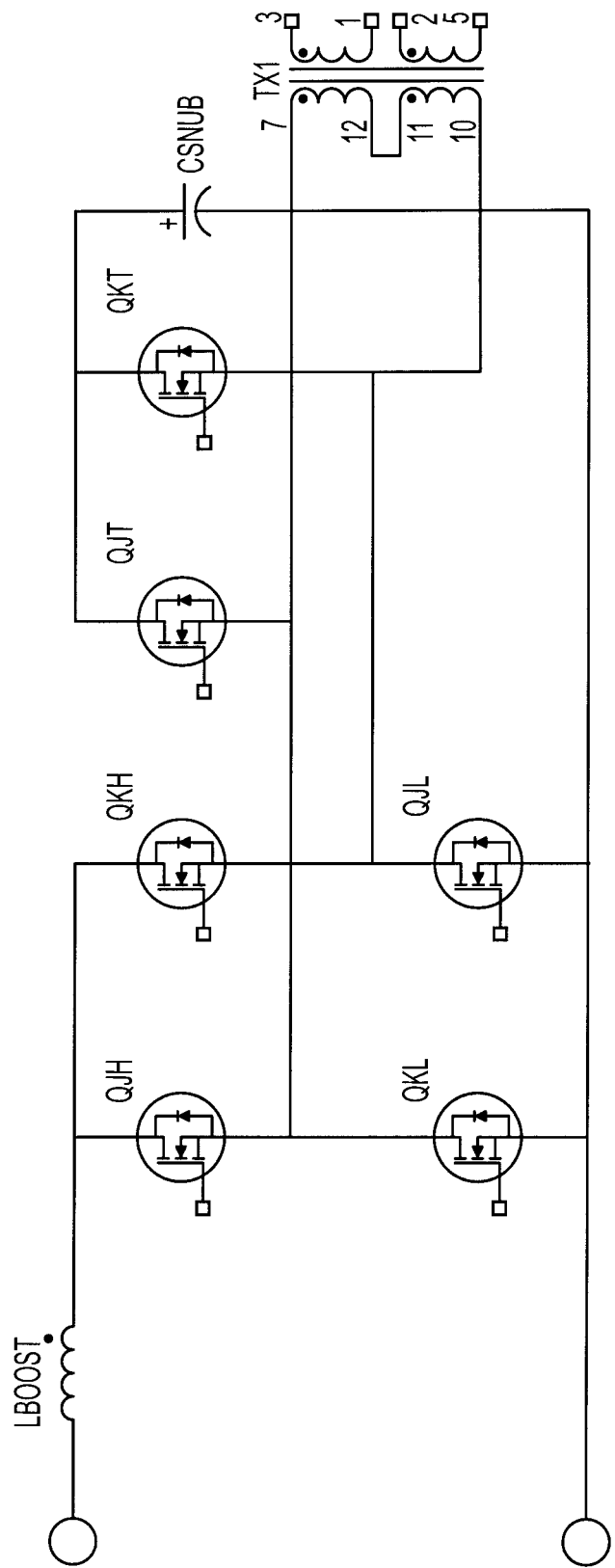
FIG. 1(B) is a schematic diagram of a power conversion circuit according to some other illustrative embodiments of the invention.
Figure 6:
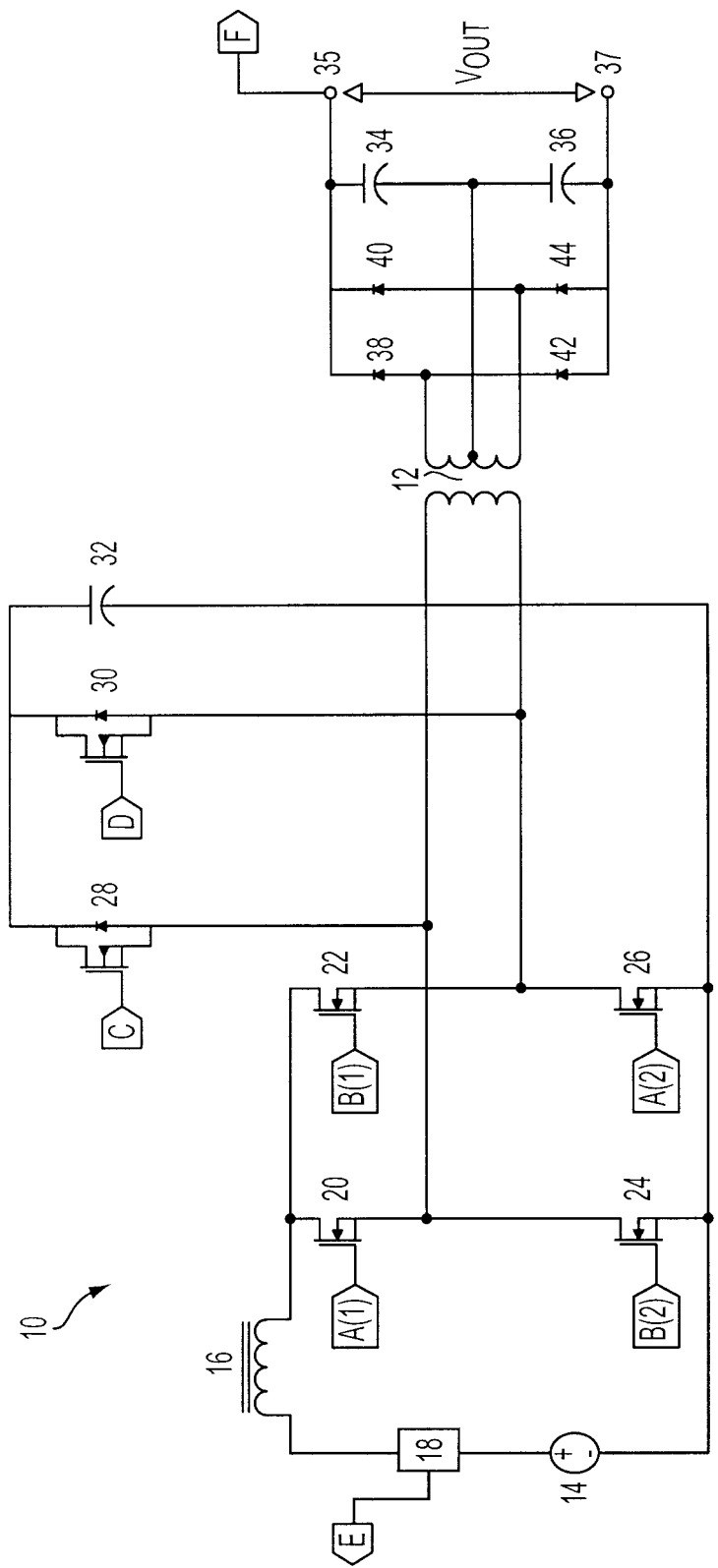
FIG. 6 is a schematic diagram of a background power conversion circuit as shown FIG. 1 of U.S. Pat. No. 6,898, 093.
Figure 7:
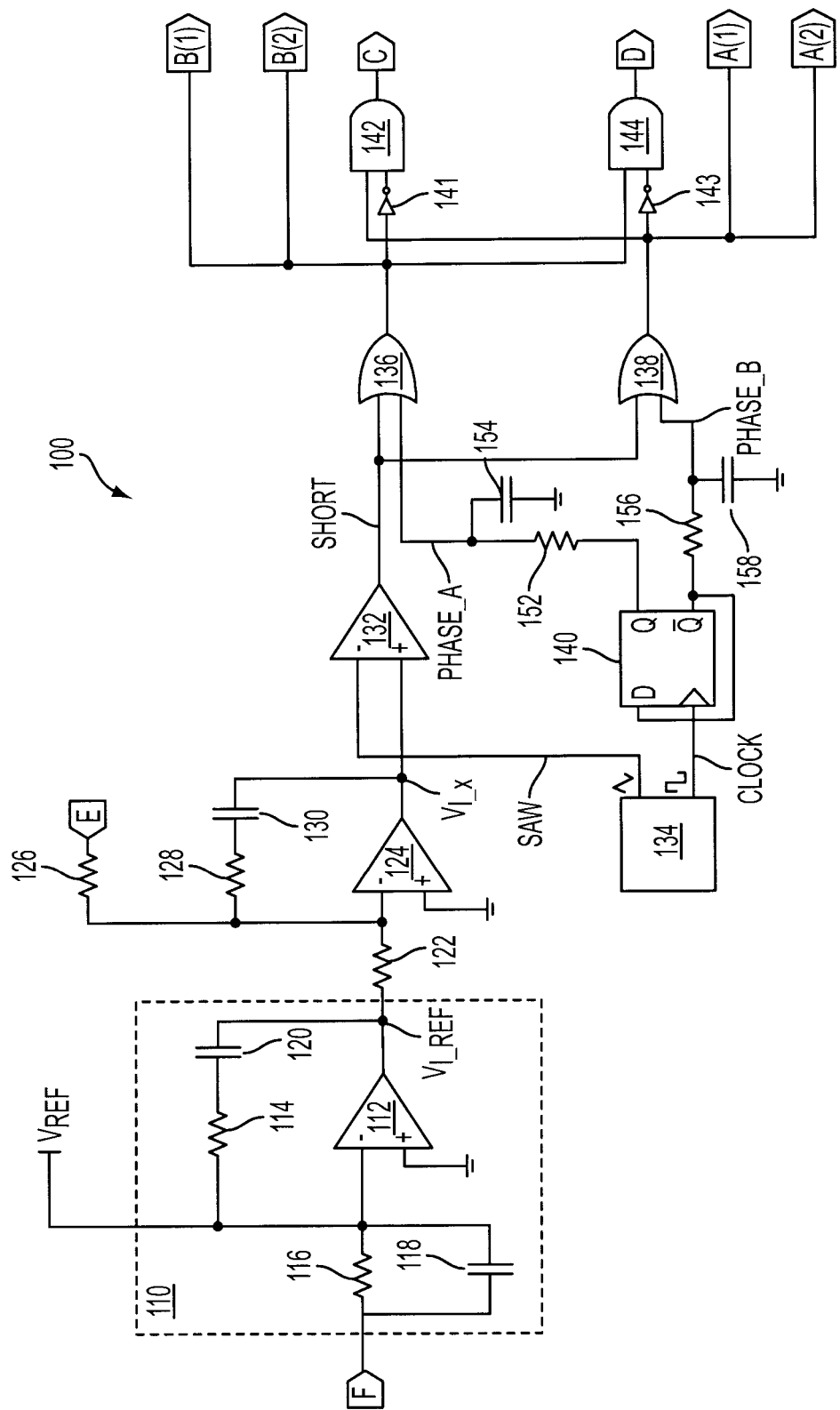
FIG. 7 is a schematic diagram of a background control circuit as shown in FIG. 2 of U.S. Pat. No. 6,898,093.

In addition, while FIG. 1(A) depicts one preferred embodiment that employs two capacitors, in other embodiments the number of capacitors can be varied. For example, referring to FIG. 1(A), in some embodiments the dashed-lined encircled portion designated CLAMP can be modified so as to involve a single capacitor. By way of example, as shown in FIG. 1(B), in some embodiments a single capacitor CSNUB can be employed. Notably, a single capacitor could, e.g. be employed in a manner generally similar to that depicted in the background art shown in, e.g., FIG. 1 of U.S. Pat. No. 6,898, 093 incorporated herein by reference herein at FIG. 6.

Figure 4:
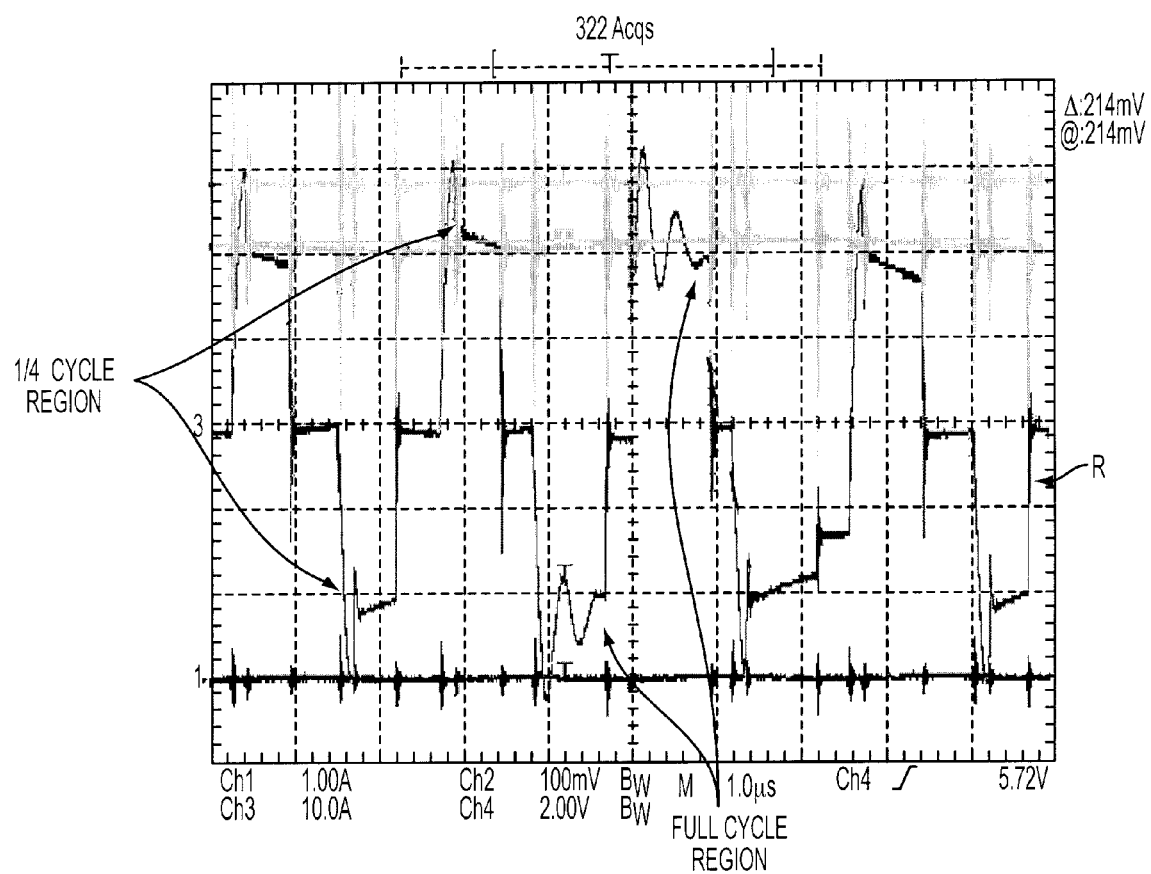
FIG. 4 is a graphical diagram showing a waveform based on an actual exemplary circuit.
Figure 5:
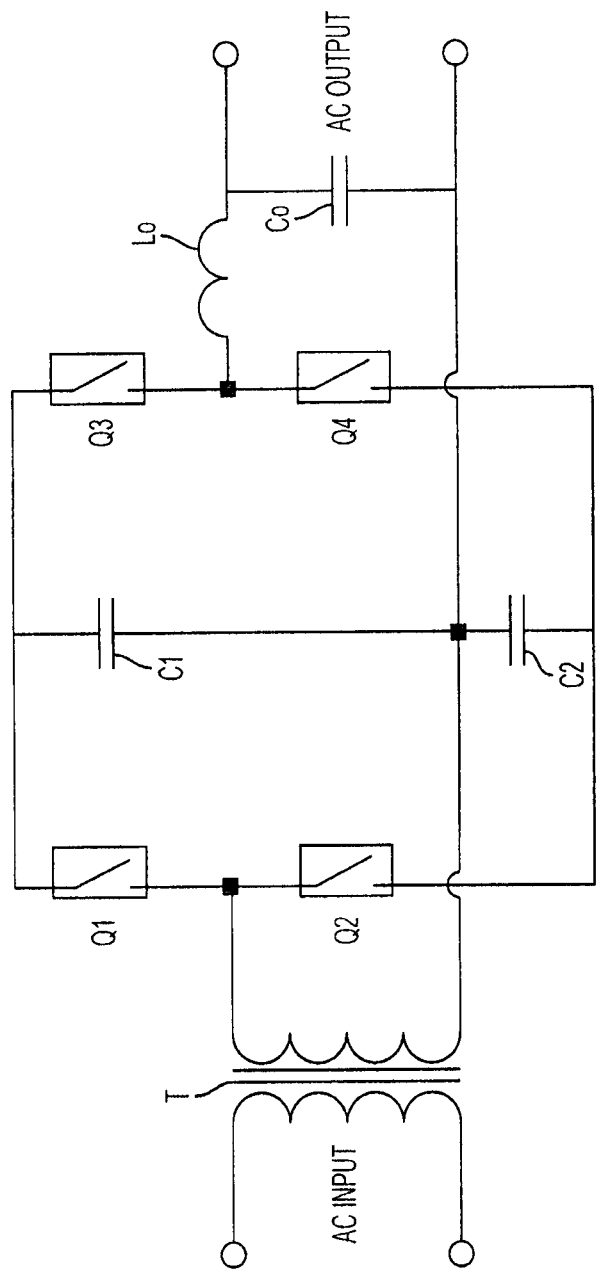
FIG. 5 is a schematic diagram depicting an illustrative conventional UPS system.

With reference to FIG. 4, a graphical diagram is depicted that shows a waveform printout based on an actual exemplary circuit that was constructed and tested. In this regard the printout shown in FIG. 4 was created utilizing a controller circuit (not shown) which has the timing control. As shown, the first two regions show cases where it is nearly quarter cycle regeneration. Usually, current is generally flat thereacross, but in the regeneration period, there is a short spike and it is abruptly cut off by the circuit. In next cycle, it ran be seen that instead of just a ¼ cycle, it continues on from positive and going back negative again, then positive again and then again to zero. Because the current does not benefit the circuit, and actually uses more energy by passing current and inducing more Watts, it is desirable to get rid of that.

In the graph shown in FIG. 4, a boundary in the controller between two different operating modes is illustrated. One reason for two operating modes is to control the output voltage during the light load case—i.e., by switching between the two operating modes.

In FIG. 4, the line R shows the primary current and the difference between the ¼ cycle and the full cycle and back to ¼ cycle. FIG. 4, thus, shows an illustrative and non-limiting example of an actual waveform of an illustrative and non-limiting exemplary circuit.

Figure 2A:
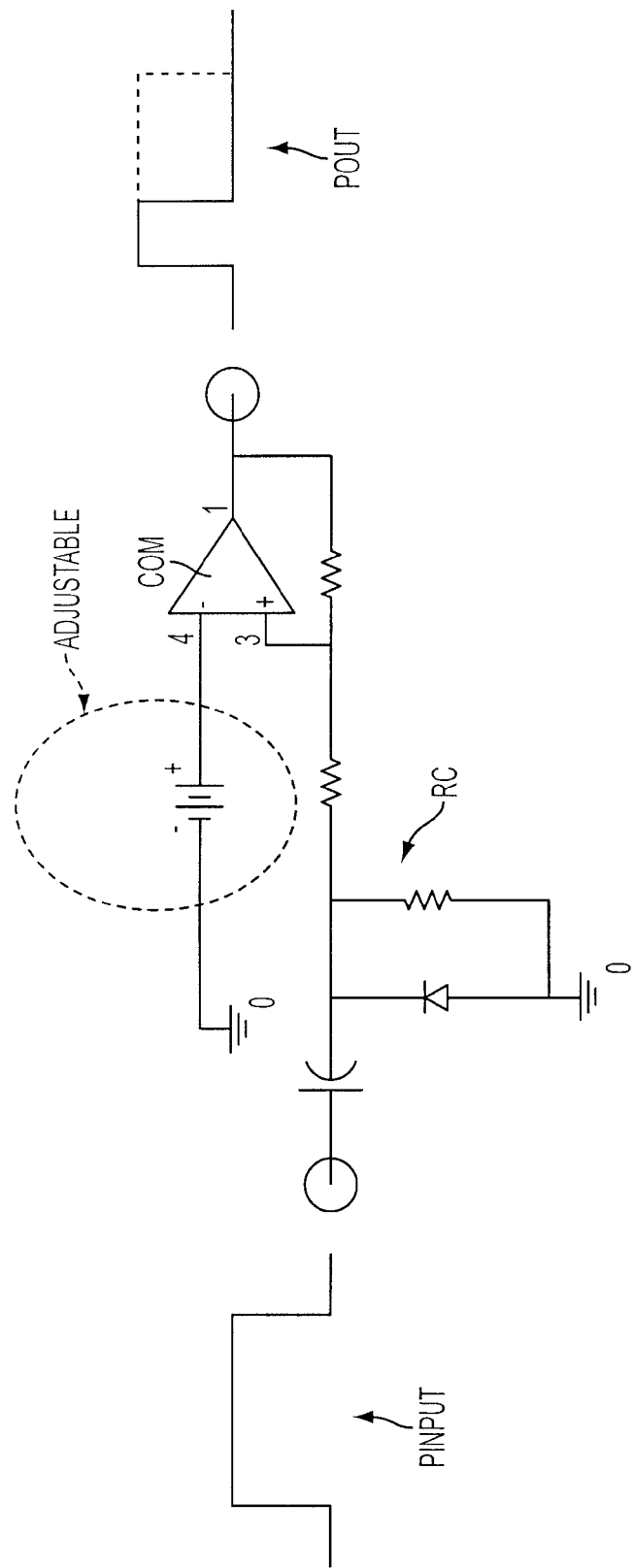
FIG. 2(A) is a schematic diagram of an illustrative and non-limiting control circuitry method to implement pulse duty change according to some of the preferred embodiments.
Figure 2B:
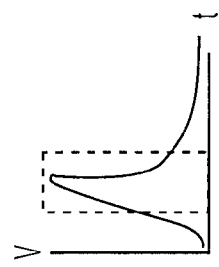
FIG. 2(B) is a diagram graphically depicting volts to time for explanatory purposes of some illustrative embodiments.
Figure 3:
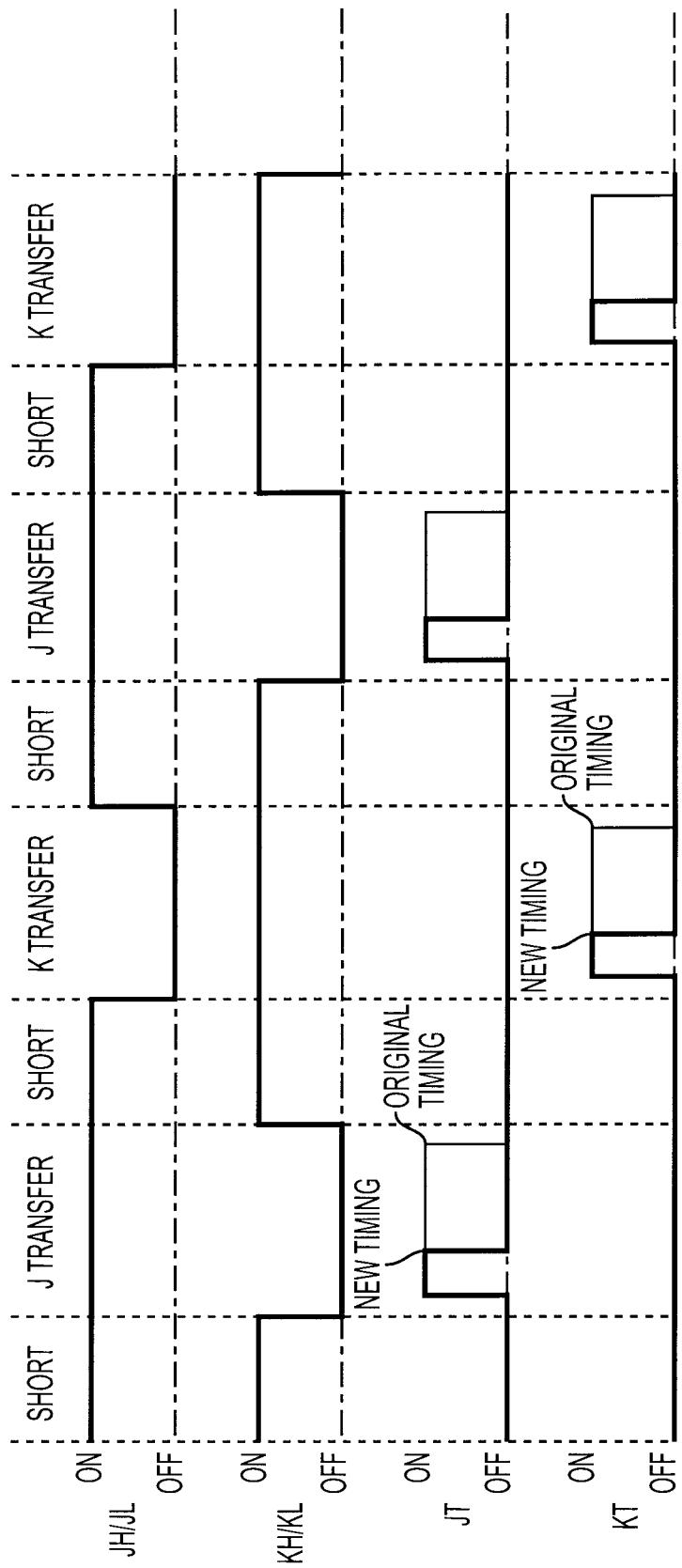
FIG. 3 is a timing diagram of the power conversion circuit of FIG. 1(A) during normal operation according to some illustrative embodiments.

Referring now to FIG. 2(A), the figure shows an illustrative and non-limiting control circuitry method to implement pulse duty change according to some of the preferred embodiments. As illustrated, the system includes a comparator COM in the circuit and a reference voltage. When a voltage is applied to the capacitor COM, the outlook voltage will rise, and will look, e.g., generally like the voltage to time graph depicted in FIG. 2(B), wherein voltage V is depicted on the y axis which goes up steeply and discharges through the resistor-capacitor network RC and which would come down as shown approaching asymptotically the x-axis representing time. In the preferred embodiments, in employing a comparator and setting a reference voltage, then whenever voltage is above the comparative level, then the comparator is in high state, and whenever it drops below that level, then it goes into a low state. Accordingly, by adjusting the voltage, capacitor and/or the resistor (or any combination of them), one can readily adjust the final pulse width. In some illustrative embodiments, an input pulse $P_{input}$ generated by a simple logic circuit (not shown) can be shortened to any requirement to an appropriate output pulse $P_{out}$.

In some preferred embodiments, it is advantageous to have precision adjustment to enable adaptation of the system to a desirable cycle—such as, e.g., between about slightly above ¼ cycle to about ½ cycle. For example, it is advantageous to allow for some adjustability in the construction and/or modification of the system, such as, e.g., via capacitor and/or resistor change, via hardware change and/or via some voltage references, such that, e.g., a final selection of a transformer can determine how much leakage inductance there will be and then, e.g., a final selection of a capacitor can determine how long the cycle needs to be and how long the, e.g., about ¼ cycle is. In this regard, it is noted that the resonance frequency can be represented approximately as $f = ½ \Pi\sqrt{LC}$, where L is leakage inductance in henries, and C is capacitance in farads. From this resonance frequency, where T is 1/f resonant frequency, a selection of a cycle time of between about ¼ cycle and ½ cycle is made, staying somewhere in that range, e.g., just above the quarter cycle and far enough from the ½ cycle to allow for component tolerances, both capacitor tolerances (such as, e.g., about a 10% capacitance in order to have reasonable cost) and then transformer manufacturing tolerances can change the leakage inductance slightly such that one would desire to be able to vary that.

With reference to FIG. 2(A), although in some embodiments, the system is not adjustable, in some alternative embodiments, the system can be adapted so as to be adjustable. In this regard, in some examples, a circuit similar to that shown in FIG. 2(A) can be provided that enables one to change it in an adjustable manner. For example, this could enable one to change it as desired based on circumstances. In this regard, instead of fixed reference, one could employ, e.g., a microprocessor that could generate a pulse-width modulation (PWM) value, such as to enable controlling into an equivalent DC and that can be an adjustable reference instead of having a fixed reference in the circuit. Here, adjustment as needed (e.g., on the fly) could then be used to, e.g., optimize efficiency and/or the like.

According to some preferred embodiments, active-regeneration control is provided that employs a comparator circuit with feedback from current-fed PI Control to select one of two active-clamp regeneration times:

a) According to a first instance, at light load, output of current-fed converter would continue to rise. In some implementations, this problem can be solved by turning the regeneration circuit ON for the entire or substantially the entire current-transfer cycle.

b) According to a second instance, at loads above some appropriate level (e.g., above a light load level), the resonance between the regeneration capacitance and the transformer's leakage inductance would result in excessive ringing currents and/or lost efficiency. In this regard, this problem can be solved by reducing the regeneration period to about one quarter (¼) of the resonance-frequency cycle to about ½ of the resonance-frequency cycles or, in some preferred embodiments, to about ¼ to ⅓ of the resonance-frequency cycle, or, in some preferred embodiments, to about slightly over ¼ of the resonance-frequency cycle.

In this regard, if the system is operating in this about ¼ cycle duty control then the actual output of the converter on the secondary side would continue to rise. However, if the target was, by way of example, at 400 V, it is not desirable for the secondary voltage to continue to increase from there to some point dependent partially on what the input voltage is. The idea of controlling regeneration in time and then switching it back to the full cycle under that case is to actually control the voltage. In some examples, the effect can be controlled and/or mitigated, even under extreme input over voltage conditions. In some embodiments, the effect may solve the problem alone, while in other embodiments the effect may assist in solving the problem and/or limiting the problem.

In some embodiments, other methods to control that voltage can be additionally and/or alternatively employed. For example, as load is increased, there may be experienced more of this resonant current flowing because there would then be more energy being stored in the transformer leakage inductance such that this resonance issue becomes a problem. Thus, it can be desirable to apply the about ¼ cycle to, e.g., limit the amount of back and forth energy flow.

Regeneration Tank Splitting:

According to some other embodiments of the invention, a regeneration tank splitting feature can be employed in environments described herein and/or in other environments as would be understood by those skilled in the art based on this disclosure. In this regard, a regeneration tank splitting feature can be implemented, e.g., to allow monitoring and control of the transformer's saturation status. For example, if an isolation transformer in a full-bridge current-fed converter begins to saturate, the voltage difference between each regeneration capacitor will increase. Theoretically, identical switches with identical drive/heat-dissipation conditions with no duty-cycle modulation should not saturate the isolation transformer as long as the Volt×Second product is kept well within the specifications of the transformer. However, sufficient deviations in switch characteristics, drive conditions and/or modulation effects can result in conditions such as:

a. core flux walking (e.g., possibly reaching core saturation); and/or b. excessive Volt×Second product applied to the transformer even if the Volt×Second product integrates to zero over one cycle.

By monitoring the Voltage on each regeneration capacitor and correcting for component tolerances, the transformer's drive condition can be controlled to minimize, if not eliminate, instances of saturation.

By way of example, in embodiments described hereinabove, a single capacitor can advantageously be split into two capacitors. By way of example, the embodiment shown in FIG. 1(A) depicts two capacitors that can operate in accordance with principles of this aspect of the invention. Moreover, the test data depicted in FIG. 4 actually relates to an exemplary test conducted on a device employing two capacitors.

In regeneration tank splitting, rather than having, e.g., a single capacitor, the capacitor is split into multiple capacitors—e.g., two in the illustrated examples. As a result, such a feature can, e.g., help to reduce possible core flux walking. In this regard, if the amount of charge that goes into the single capacitor (FIG. 6) from the first cycle is then dumped into the transformer on the reverse cycle (e.g., such as if any uneven amount of charge), then that could possibly induce some saturation effects in the transformer. In preferred embodiments, this is split, such as, e.g., to use two capacitors (FIG. 1A), such that one can actually monitor the voltages on both capacitors and, then, if one is higher than the other that information could be used to feed back to a control circuit and use that to control the duty cycle imposed on the transformer.

In some embodiments, even if there is not a significant need to monitor the voltages and control them, implementing a system with plural, e.g., two, capacitors enables a quick and easy upgrade of the system—e.g., such as, e.g., "just in case" in the future, if it is later needed or desired, one can readily upgrade the system so as to monitor and control the system tightly.

Reduction of Total Harmonic Distortion:

According to some embodiments, a method of reducing input current Total Harmonic Distortion (THD) by controlling the maximum available duty cycle is employed. In this regard, THD involves a parameter that is applicable to AC-input mode where a sinusoidal input Voltage is boosted to some Voltage beyond the peak Voltage of the AC input waveform. When the AC input waveform is at the maximum, the required boost ratio is smallest, but as the AC input waveform approaches the zero-cross points, the highest boost-up ratio is required. Limiting the maximum duty cycle to less than about 100% can result in a dead band in the input current around the zero-cross point of the input current. However, if the maximum duty cycle increases well beyond about 100%, the input current waveform can experience a large linear current slope around the input current zero-cross point followed by a discontinuity as the linear slope connects to the sinusoidal shape. Both conditions result in a distorted input current waveform and a resulting high THD.

In some embodiments, a THD control is employed that is herein referred to as "maximum-duty-cycle control." In some embodiments, this control can be implemented in at least two ways. It is noted that a maximum duty cycle in a PWM circuit depends on a peak amplitude of a carrier (sawtooth or ramp) and a peak amplitude of a reference signal. Given a ramp generator using a constant-current source, the peak amplitude (and, hence, the maximum duty cycle) can be varied by:

a. Adjusting the carrier frequency by software and/or hardware. Notably, a higher carrier frequency means a smaller period, and, thus, less ramp time and smaller peak amplitude with a final result of a higher maximum duty cycle. Accordingly, increasing the carrier frequency can increase the maximum duty cycle. As an illustrative but not limiting example, the carrier is applied to the inverting (−) side of a comparator and the reference signal to the noninverting (+) side of the same comparator to generate the PWM signal.

b. Adjusting the ramp reset period, but keeping the carrier frequency constant or substantially constant. Notably, a longer reset period gives a shorter ramp time and, hence, a smaller peak amplitude and a higher maximum duty cycle. Accordingly, increasing the ramp reset period can increase the maximum duty cycle. The comparator circuit described in item "a" immediately preceding provides an illustration of an exemplary PWM generator (but, as noted, does not provide a limitation to the scope of this patent).

Broad Score of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A power converter, comprising:
   a current source and an inductor connected to said current source to provide an input current;
   a transformer;
   a switch network connected to said current source and connected to a primary winding of the transformer;
   a clamping circuit connected to the switch network;
   a control circuit configured to control a time in a cycle that the clamping circuit is turned on,
   said control circuit controlling the clamping circuit to be turned on so that a current stored in the inductor flows to the clamping circuit for a period between about a quarter cycle and one half cycle of a resonant period beginning after the switch network is turned on,
   wherein the current flows to the transformer for a transfer period, said transfer period begins when the switch network is turned on and ends when the switch network is turned off,
   wherein said resonant period is formed when voltage oscillates between said clamping circuit and said primary winding of said transformer, said resonant period to occur within the transfer period.

2. The power converter of claim 1, wherein the clamping circuit includes a single clamp.

3. The power converter of claim 1, wherein the clamping circuit includes two clamps, and
   wherein the control circuit is configured to control each of the two clamps individually.

4. The power converter of claim 1, wherein the period extends to about ¼ to ⅓ cycle of the resonant period.

5. The power converter of claim 1, wherein the period extends to about ¼ cycle of the resonant period.

6. The power converter of claim 1, wherein the period extends to about slightly over ¼ cycle of the resonant period.

7. A power converter, comprising:
a current source and an inductor connected to said current source to provide an input current;
a transformer;
a switch network connected to said current source and connected to a primary winding of the transformer;
a clamping circuit connected to the switch network;
a control circuit configured to control the time in a cycle that the clamping circuit is turned on so that a current stored in the inductor flows to the clamping circuit for a period of between about a quarter cycle and one half cycle of a resonant period beginning after the switch network is turned on; and
wherein the clamping circuit includes at least one clamping capacitor that is gated ON a sufficient time to transfer charge and is gated OFF after about ¼ to ⅓ cycle of the resonant period,
wherein the current flows to the transformer for a transfer period, said transfer period begins when the switch network is turned on and ends when the switch network is turned off,
wherein the resonant period is approximately equal to 2Π√LC, where L is leakage inductance in henries of the primary winding of the transformer, and C is capacitance in farads of a capacitor of the clamping circuit, said resonant period to occur within the transfer period.

8. The power converter of claim 1, wherein said switch network includes at least one switch.

9. The power converter of claim 1, wherein said at least one switch includes a plurality of switches that are controlled by a control circuit.

10. The power converter of claim 9, wherein said switches include metal oxide semiconductor field-effect transistors, insulated gate bipolar transistors, or equivalents thereof.

11. The power converter of claim 1, wherein the system is configured for operating in two modes to enable switching to control an output voltage during a light load case.

12. The power converter of claim 1, wherein said resonant period is defined by a tank circuit between the transformer's leakage inductance and snubber capacitor(s).

13. The power converter of claim 12, wherein said resonant period does not take into account any influence on resonant frequency by capacitors on a secondary side of the transformer.

14. A method of active regeneration control, comprising:
employing a comparator circuit with feedback from current-fed PI or PID control to select one of two regeneration periods of at least one active clamp:
i) a first regeneration period occurring at low loads when a regeneration circuit is turned ON for substantially an entire current-transfer cycle such as to avoid output of current-fed converter continuing to rise;
ii) a second regeneration period occurring at high loads when the regeneration circuit is turned OFF between about ¼ to ½ of a resonance-frequency cycle so that a resonance between a regeneration capacitance and a transformer's leakage inductance avoids excessive ringing currents and/or lost efficiency,
wherein the entire current-transfer cycle begins when a switch network communicating with the transformer is turned on to begin supplying a current to the transformer and ends when the switch network is turned off; and
wherein the current flowing in the regeneration circuit during each of the first and second regeneration periods.

15. The method of claim 14, further including employing four switching states, including: a) a first state in which all switches are on in a charging mode to store energy in an inductor; b) a second state in which current is partially diverted to the least one active clamp to inhibit a high voltage across the switches and transformer that would result from the inductor sourcing its entire current into the transformer's leakage reactance; c) a third state in which charge from the active clamp(s) circuits is gated to the transformer to add to the current sourced by the inductor through the transformer; and d) a fourth state in which not all of the switches are on allowing transfer of power back through the transformer but just in an opposite polarity occurring from transfer of power to a load.

16. The method of claim 15, wherein said method is employed within a boost-mode current-fed converter.

17. The method of claim 14, further including employing regeneration tank splitting with said at least one active clamp including multiple clamps.

18. The method of claim 15, further including employing regeneration tank splitting with said at least one active clamp including multiple clamps.

19. The method of claim 14, wherein at high loads the regeneration period is reduced to between about ¼ to ½ of a resonance-frequency cycle so that a resonance between the regeneration capacitance and the transformer's leakage inductance avoids excessive ringing currents and/or lost efficiency by gating off active clamps at about ¼ to ½ of a resonance-frequency cycle.

20. The power converter of claim 1, further including control circuitry configured to control the amount of time that active clamps are turned on, including a voltage comparator.

21. The power converter of claim 19, further including said control circuitry being configured to provide adjustability.

22. The power converter of claim 1, wherein a resonance frequency is approximately $$f = \frac{1}{2\pi\sqrt{LC}},$$

where L is leakage inductance in henries, and C is capacitance in farads, and resonant cycle time T is 1/f.

23. The method of claim 17, further including monitoring the voltage on two regeneration capacitors and correcting for component tolerances such as to control a transformer's drive condition to minimize instances of saturation.

24. The method of claim 14, further including reducing total harmonic distortion by controlling the maximum available duty cycle.

25. The method of claim 23, further including controlling a maximum available duty cycle by adjusting a carrier frequency and/or a ramp reset period.

26. The power converter of claim 1, wherein said clamping circuit includes a capacitor and wherein one end of said capacitor is attached to one end of said clamp control circuit, and another end of said clamp control circuit is attached in between an output of a first transistor of the switch network and an input of a second transistor of the switch network.

* * * * *